3,576,777
PAINTS WITH THIXOTROPIC PROPERTIES
Wolfram Neumann, Leverkusen, Erich Zankl, Cologne-Riehl, Hans Joachim Kreuder, Krefeld, and Heinz Ehring, Krefeld-Gartenstadt, Germany, assignors to Farbenfabriken Bayer Aktiengesellschaft, Leverkusen, Germany
No Drawing. Continuation-in-part of application Ser. No. 659,339, Aug. 9, 1967. This application Oct. 7, 1969, Ser. No. 864,554
Claims priority, application Germany, Aug. 30, 1966, F 50,076
Int. Cl. C09d 3/66, 3/72, 5/04
U.S. Cl. 260—22                                 4 Claims

ABSTRACT OF THE DISCLOSURE

Thixotropic unsaturated oil modified alkyd resins containing from about one percent to about 30 percent by weight of a polyurethane prepared from an organic diisocyanate and a glycol are utilized to prepare paints having thixotropic properties even when large quantities of solvent are used and during oven drying.

---

This application is a continuation-in-part of copending application S.N. 659,339 filed Aug. 9, 1967 and now abandoned. This invention relates to paints having thixotropic properties and particularly to thixotropic alkyd paints.

The advantages provided by paints adjusted to be thixotropic are known. The storage stability and also the subsequent workability of such thixotropic, pegmented products are fundamentally improved, since the tendency to sedimentation of flocculation of pigments, fillers, metal powders, etc., are substantially or completely eliminated, depending upon the adjusted degree of thixotropy.

Thixotropic paints are for this reason made ready for use more easily and quickly. A preparatory stirring prior to use is avoided. When the paints are applied by brushing, spraying or rollers, after the quickly occurring deformation of the gel structure by the operating shearing forces, they can be worked more easily and with the application of less energy than similar but non-thixotropic products.

During the painting operation, the support skeleton causing the gel structure is temporarily destroyed. However, it is reformed relatively quickly in the state of rest and as a result prevents the film of paint from dripping or running off vertical surfaces. Prerequisites for this condition are, firstly, a sufficiently high degree of thixotropy in the paint and, secondly, the quickest possible regeneration of the flow anomaly, i.e., the reformation of the original gel structure.

It is clear that substantially thicker and more uniform films of paint result therefrom.

Of particular value for practical purposes is the fact that thixotropic paints produce with substantially fewer coatings the same total thickness of a coat as in the case of normally flowing, similar products. As well as the saving in labor, there is the saving in time, which is a decisive factor in these cases where the structures to be painted are exposed to the weather, for example, ships, bridges and iron constructions of all types.

In order to produce a sufficient degree of thixotropy, thickening and gelling agents which are based on colloidal silica, alkylamine-modified minerals, high molecular weight amines, hydrogenated ricinoleic acid and/or their amides, or emulsifiers, are used in the lacquer industry.

These products partially reduce, for example, the stability in storage, in the case of lacquers giving a hammered metal effect. With such lacquers, a greying of the aluminum bronze concurrently used can occur; with relatively large additions, streaky coatings can be formed after brushing on account of the flowability being too greatly reduced; with oven drying lacquers, the disadvantage further occurs that the action of the gelling and thickening agents during the stoving process, for example, due to exceeding the melting point, is lost, so that the thixotropy is destroyed and the paint runs down on vertical surfaces during the stoving.

It is known that lacquer raw materials which have an inherent thixotropic property (German Auslegeschrift No. 1,117,801), e.g., thixotropic alkyd resins, can be used instead of other auxiliaries. These lead in their combination to strong to very strong flow anomalies. The formation of the gel structure in such thixotropic alkyd resins depends on the high alignment and orientation power of incorporated carbonamide groups, preferably amides of fatty acids or their dimers.

It is precisely in connection with oven drying or acid hardening lacquers that it is found that the orientation power of the carbonamides is completely destroyed on account of the presence of relatively large quantities of strongly polar solvents, such as alcohols or esters, or less strongly polar solvents, such as xylene or toluene, or is at least reduced to such a degree that the effect of thixotropy upon brushing or spraying vertical surfaces and particularly during the stoving is lost in practice. Since it is not possible, on the grounds of increasing stability, a lack of compatibility between the separate components or the improvement in solubility, particularly with the concurrent use of melamine or urea resins, to forego the addition and working of relatively large quantities of polar solvents, it is accordingly not possible to arrange for the types of lacquers mentioned by way of example to be thixotropic to a degree sufficient for practical purposes by this, in itself, very desirable method of using a thixotropic binder.

Certain thixotropic urethane oils (Auslegeschrift No. 1,049,575) do, of course, have a good resistance of their gel structure to polar solvents, but it is still impossible, on account of their too large proportion of oil, to combine them with normal commercial alkyd resins with a lower fatty acid content, e.g., oven drying and acid hardening alkyd resins. Such mixtures firstly lack a sufficient compatibility, and secondly produce inevitably useless films of paint containing defects.

As is known, oven drying and acid hardening alkyd resins with a low oil content have only a limited compatibility with other film formers, and it was not to be expected that pure, unmodified, i.e., more especially, oil-free polyurethanes (Auslegeschrift No. 1,217,611) could be combined therewith and produce homogeneous products without causing disturbances in the formation of the film.

It is therefore an object of this invention to provide thixotropic paints. It is another object of this invention to provide thixotropic paints based on alkyd resins. It is still another object of this invention to provide thixotropic paints, the properties of which are not destroyed by the presence of polar solvents.

The foregoing objects and others that will become apparent with the following description, are accomplished in accordance with the invention, generally speaking, by providing unsaturated oil modified alkyd resins containing from about 1% to about 30% by weight of a polyurethane prepared from an organic diisocyanate and a glycol. If desirable, optionally small quantities of monoisocyanates and monoalcohols may concurrently be used. Thus, the invention contemplates paints of unsaturated oil modified alkyd resins containing polyurethanes which do not lose their thixotropic properties, even in the presence of strongly polar solvents and during the stoving operation.

The polyurethanes imparting thixotropy to the paints according to the invention are prepared from diisocyanates and diols, by allowing the components to react with one another at a high temperature. The reaction is preferably carried out in an inert gas atmosphere at temperatures between 80° C. and 250° C., the diisocyanate being added to the diol or even, conversely, the diol being added to the diisocyanate. The reaction products are light yellow to brown resins, e.g., waxlike, soft to solid resins, which are, for example, soluble in aromatic hydrocarbons, esters, alcohols or ketones and impart thixotropic properties, even when added in small quantities to these solvents.

Depending upon the composition, the softening point of these polyurethanes is approximately between 50° C. and 220° C. The quantitative ratios between diisocyanate and diol in the preparation of the polyurethanes depend on whether it is desired to obtain polyurethanes containing OH groups or those containing NCO groups. Accordingly, either an excess of diisocyanate or an excess of diol is used. Small quantities of monoisocyanates and monoalcohols can optionally be concurrently used. The polyurethanes can also be prepared in neutral solvents which do not react with isocyanates. In different cases, the production of the polyisocyanates can even be already undertaken in the raw materials of the lacquer to which these reaction products are to be added according to the invention.

Any suitable organic diisocyanates may be used, such as, for example, aliphatic diisocyanates, such as tetramethylene - 1,4 - diisocyanate, hexamethylene - 1,6 - diisocyanate, heptamethylene - 1,7 - diisocyanate, and the like; symmetrical cycloaliphatic diisocyanates such as 1,4-diisocyanato - cyclohexane, and the like; dicyclohexylmethane - 4,4' - diisocyanate, symmetrical aromatic diisocyanates, such as diphenylmethane - 4,4' - diisocyanate and diphenyldimethylmethane - 4,4' - diisocyanate, diphenylether - 4,4' - diisocyanate, diphenylethane - 4,4'-diisocyanate and the like, aralkylene diisocyanates such as, 1,5 - dimethyl - (2,4 - ω - diisocyanatomethyl) - benzene, xylylenediisocyanate and the like; alkylisocyanato arylisocyanates such as, 4 - ω - ethylisocyanatophenyl isocyanate, 4 - ω - methylisocyanatophenyl isocyanate and the like; sterically hindered diisocyanates such as, those that carry alkyl groups juxtaposed to the NCO group can be used with particular advantage, such as 1,3,5 - triethylbenzene diisocyanate, 3,5,3',5' - tetraethyldiphenylmethane diisocyanate, 3,5,3',5' - tetraisopropylbenzene diisocyanate, 2,3,5,6 - tetramethylbenzene - 1,4-diisocyanate, 1,3,5 - trimethyl - (2,4 - ω - diisocyanatomethyl) - benzene, in particular, 1,3,5 - triisopropylbenzene diisocyanate and the like. Any suitable monoisocyanate can be concurrently used in small proportions, such as, cyclohexylisocyanate, phenylisocyanate, allylisocyanate, dodecylisocyanate, octadecylisocyanate and the like. Instead of the free isocyanates, it is also possible to use adducts of isocyanates and phenols which react like isocyanates, these being the so-called agents splitting off isocyanates.

Any suitable polyalcohol can be used for the production of the thixotropic polyurethanes such as, for example, ethylene glycol, butane-1,3-diol, butane-1,4-diol, hexane-1,6-diol, 2,2-dimethylpropane-1,3-diol, cyclohexane-1,4-diol, 2-ethylhexane-1,3-diol, 2-methylpentane-2,4-diol, 2 - methyl - 5 - ethyl - nonane - 2,4 - diol, 2,2 - (p-hydroxycyclohexyl) - propane 2,2 - di - [p - (hydroxyethoxy) - phenyl - propane] and the like. It is preferred to use diols with a relatively long chain and having more than 10 carbon atoms, such as dodecane-1,12-diol and especially octa-9,10-decene-1,12-diol and octadecene-1,12-diol. Any suitable monoalcohols can be used concurrently in small proportions such as, ethanol, butanol, 2-ethyl-1-hexanol, olein alcohol, stearyl alcohol and the like. Polyesters containing hydroxy groups and of relatively low molecular weight can also be concurrently employed. The aforementioned alcohols can also be used in admixture with one another.

The polyurethanes to be used according to the invention are to contain approximately from 2 to 20 and advantageously from 2 to 10 urethane groups.

By far the best results are produced if polyurethanes of long-chain diols and of diisocyanates carrying alkyl groups in all neighboring positions to the isocyanate groups are used. The properties of such polyurethanes which produce thixotropy are far better than those of the polyurethanes prepared from unsubstituted polyisocyanates and short-chain diols. The use of polyurethanes containing functional groups is particularly advantageous. It is found that such polyurethanes can be satisfactorily combined with, for example, medium oil or short oil alkyd resins, By way of example, with oven drying alkyd resins, the polyurethanes containing OH groups and present in the thixotropy carrier can concurrently react during the stoving in combination with melamine-formaldehyde or urea-formaldehyde resins and be firmly anchored in the film structure. Thixotropic polyurethanes containing NCO groups can also react with hydroxyl groups present in the alkyd resin during the drying or hardening and thus be combined with the lacquer raw material. In this way, it is possible successfully to produce binders which yield thixotropic lacquers which are both air drying and in particular oven drying or acid hardening, the lacquers supplying coats of paint without any defects.

According to the invention, paints which are based on known unsaturated oil modified alkyd resins provide thixotropic properties when they have a solids content of from 1 to 30% and advantageously from 10 to 20% of the polyurethanes as previously described. The quantity of the thixotropy carrier naturally depends in such cases on the required degree of thixotropy and also on the nature of the alkyd resin. The thixotropic alkyd resins are prepared by melting the thixotropy carrier in the modified alkyd resin at temperatures of from 50° C. to 250° C., especially at from 120° C. to 160° C., until a homogeneous mixture is formed.

Any suitable unsaturated oil modified alkyd resin may be used such as those obtained from polycarboxylic acids and polyhydric alcohols, which are modified with an unsaturated oil. Any suitable polycarboxylic acid may be used such as, for example, phthalic, isophthalic, terephthalic, succinic, adipic, maleic, fumaric, malic, citric, camphoric, diphenic, the anhydrides thereof and the like. Any suitable polyhydric alcohol may be used such as, for example, ethylene glycol, butylene glycol, hexamethylene glycol, pinacol, glycerol, trimethylolpropane, hexanetriol, erythritol, pentaerythritol, manitol and the like. The resin is modified, in known manner, with various oils in various quantities such as, ricinenic oil, soya oil, linseed oil, perilla oil, tung oil, corn oil, croton oil, castor oil, olive oil, coconut oil, the fatty acids thereof, the vinyl toluene or styrene modified oils and the like. Further, for oven drying lacquers, the alkyds may be combined with commercial amino resins, such as urea formaldehyde, melamine resins and the like. They may also contain the usual additives such as, pigments, fillers, driers, stabilizers, substances giving special effects, skin-reducing agents and the like.

These unsaturated oil modified alkyd resins may according to the invention be made so strongly thixotropic that even the presence of large quantities of polar solvents, such as alcohols, esters or ketones, or less polar solvents, such as xylene or toluene, has no harmful influence on the gel structure formed during the incorporation into paints and also the working thereof, and does not destroy the intermolecular bonding powers of the urethane groups.

It is possible in this way to obtain thixotropic, oven drying, acid hardening and air drying lacquers, lacquers giving a hammered metal effect and aluminum lacquers.

It is precisely the processing of hammered metal effect lacquers and other lacquers giving special effects that is known to be made difficult by the fact, that, when these lacquers are sprayed onto vertical surfaces in relatively thick layers, they have a tendency to run down. As a consequence, a limit is set to the use of such lacquers as single coat paints, since an adequate resistance to weather influences is only guaranteed by a sufficient thickness of the coat.

By the use of the alkyd resins modified according to the invention with polyurethanes, thick coats can be obtained on vertical surfaces without any running during the working or during the stoving operation, the storage stability and the metallic brilliance of the effect being also maintained.

It is obvious that all types of paints, such as clear, pigmented or matt lacquers, primers, pre-lacquers and trowelling compositions, can be made thixotropic by the method according to the invention.

The invention is further illustrated by the following examples in which parts are by weight unless otherwise specified.

EXAMPLE 1

(a) Preparation of the thixotropic polyurethane

About 286 parts of triisopropylbenzene diisocyanate are added dropwise in about two hours to about 572 parts of octadecane-1,12-diol, with stirring and at from about 150° C. to about 160° C. in a nitrogen atmosphere. Stirring is continued at this temperature for a period of from about 4 to about 6 hours until the NCO value has fallen to 0. The product is a light yellow resin similar to hard wax and with a softening temperature of from about 120° C. to about 126° C.; content: 3.4%; acid number: 0.3.

(b) Preparation of the thixotropic alkyl resin

About 350 parts of the thixotropy support from step (a) are added in the form of small lumps to about 1650 parts of an alkyl resin based on non-drying vegetable fatty acids (26% fatty acid, calculated as triglyceride and 49% phthalic anhydride) which was prepared from 1720 parts by weight of non-drying vegetable fatty acid, 1108 parts by weight of glycerol, 1260 parts by weight of 1,4-butandiol, 56 parts by weight of maleic anhydride and 3400 parts by weight of phthalic anhydride at 190° C. OH-No.=80, acid-No.=<10, the mixture being heated with slow stirring to about 150° C. in nitrogen atmosphere. At this temperature, the mixture becomes homogeneous and clear after about 4 to 6 hours, samples being taken to check this state; stirring is then continued at this temperature until a sample, 60% in xylene, remains clear, this being the case after approximately another 6 hours. The complete mixture is then adjusted with xylene to 60%. The solution of a clear, highly thixotropic alkyd resin is obtained.

(c) Preparation of a lacquer

An oven drying (30 minutes at 120° C.) hammered metal effect lacquer is prepared from:

About 57.20 parts of the alkyd resin from step (b),
About 16.10 parts of urea formaldehyde resin,
About 10.30 parts of xylene,
About 3.40 parts of butyl acetate,
About 2.20 parts of butanol,
About 1.20 parts of butyl glycolate,
About 2.98 parts of ethyl glycol acetate,
About 3.42 parts of non-leafing aluminum bronze,
About 0.86 part of silicone oil (1% in xylene), and
About 0.14 part of silicone oil (as the effect giver), 10% in white spirit.

In a comparison test, the thixotropic alkyd resin was replaced by about 57.20 parts of the same alkyd resin, to which the polyurethane was not added.

By comparison with the hammered metal effect lacquer based on the thixotropic alkyd resin, the lacquer with the non-thixotropic alkyd resin shows a strong tendency to run with a wet film coating of 240μ. After the stoving (upright), the same dry film layer thicknesses were measured with the thixotropic lacquer on the top and bottom edge at 50μ, whereas with the non-thixotropic comparison lacquer, 25μ was measured at the top edge and 60μ at the bottom edge, which clearly shows the running tendency, quite apart from the optical impression. With the stoving of the thixotropic lacquer and by contrast with the non-thixotropic lacquer, no running occurred.

EXAMPLE 2

(a) Preparation of the thixotropic alkyd resin

About 200 parts of the thixotropy support described in Example 1(a) are added to about 800 parts of an alkyd resin based on ground nut oil fatty acid and cocoanut oil fatty acid (26% oil, calculated as triglyceride, 29% phthalic anhydride) and prepared from 1720 parts by weight of ground nut oil fatty acid, 860 parts by weight of coconut oil fatty acid, 1662 parts by weight of glycerol, 904 parts by weight of ethylene glycol, 1054 parts by weight of dipropylene glycol, 5115 parts by weight of phthalic anhydride and 87 parts by weight of maleic anhydride at 180° C. OH-No.=90 to 100, acid-No.=<10, and then further processed as described in Example 1(b).

(b) Preparation of a lacquer

A hammered metal effect lacquer hardening by chemical reaction is prepared from:

About 22.50 parts of the alkyd resin of step (a),
About 22.50 parts of a urea formaldehyde resin,
About 41.70 parts of xylene:butylacetate; glycol monoethylether:isopropanol 8:8:7:7,
About 2.70 parts of aluminum bronze paste, containing 62% of aluminum powder as non-leafing type and 38% solvent, and
About 0.40 part of a 10% silicone oil solution as effect giver.

The lacquer is hardened with:

About 10.60 parts of a 10% p-toluosulphonic acid solution in glycol monoethylether, which is added as a catalyst only shortly before applying by spraying.

The lacquer can be sprayed up to a wet coating of 150–200 g./m.$^2$ (corresponding to a dry coat thickness of 60–80μ) onto vertical surfaces without running.

EXAMPLE 3

(a) Preparation of the thixotropic alkyd resin

About 150 parts of the thixotropy support described in Example 1(a) are added to about 850 parts of an alkyd resin based on cotton seed fatty acid and soya oil fatty acid (48% oil, calculated as triglyceride, 26% phthalic anhydride which was prepared from 2000 parts by weight of soya oil fatty acid, 1205 parts by weight of cotton seed fatty acid, 828 parts by weight of benzoic acid, 1600 parts by weight of pentaerylthritol and 1815 parts by weight of phthalic anhydride at 230° C. OH-No.=40 to 50, acid-No.=<5 and then further processed as under Example 1(b).

(b) Preparation of a lacquer

An air drying, hammered metal effect lacquer is produced from:

About 50.00 parts of the alkyd resin of step (a),
About 3.00 parts of a drier solution, containing 1.5% $Co^{++}$, 22.0% $Pb^{++}$ and 1.5% $Mn^{++++}$, calculated as metal ions,
About 44.50 parts of xylene-butylacetate-isopropanol 10:10:7,
About 50.50 parts of aluminum bronze paste, containing 60% aluminum powder as non-leafing type and 38% solvent, and
About 0.25 part of a 10% silicone solution as effect giver.

The lacquer can be sprayed to a wet coating of 150–200 g./m.$^2$, corresponding to a dry coat thickness of 60–80μ, on vertical walls without running.

EXAMPLE 4

A single coat stoving lacquer consisting of:

About 25.00 parts of the thixotropic alkyd resin of Example 1(b),
About 11.00 parts of a melamine formaldehyde resin,
About 36.00 parts of xylene butanol 8:2,
About 28.00 parts of pigments and fillers, when applied by spraying to a 100% thicker wet coating than obtained with the corresponding alkyd resin containing no thixotropy support and with a wet coating of 100 g./m.$^2$, leads to a dry film thickness of only 40μ. When the thixotropic lacquer is applied to vertical surfaces or during the stoving (30 minutes at 140° C.–160° C.), no running occurs. Since the resistance of a lacquer coating to weather influences and to the attack of chemical agents depends on the thickness of its coating, it is advantageous to apply greater coating thicknesses in this way.

EXAMPLE 5

(a) Comparison

The spraying of an acid hardening lacquer, consisting of:

About 24.50 parts of an alkyd resin modified with ricinenic oil (40% oil, 38% phthalic anhydride). The alkyd resin was prepared from 1870 parts by weight of ricinenic oil, 639 parts by weight of trimethylolpropane and 930 parts by weight of phthalic anhydride. This mixture is heated during 8 h. at 260° C., then cooled to 250° C., 685 parts by weight of trimethylolpropane are added, the temperature of 250° C. is maintained during 1 h. After cooling to 130° C. and addition of 870 parts by weight of phthalic anhydride esterification is continued at 180° C. until the acid-No. is 20.
About 24.50 parts of a normal commercial ureformaldehyde resin,
About 51.00 parts of xylene:ethylglycolacetate:butylglycolate 8:4:4, to which are added
About 5.00 parts of a 10% hydrochloric acid solution (10 parts by weight of concentrated HCl solution—theoretical content of HCl: 36%—and about 26 parts of glycol monomethylether) as catalyst, before the processing, can be applied to vertical surfaces with a wet coating of up to 80 g./m.$^2$, corresponding to a dry film thickness of only 35μ without any substantial running.

(b) Thixotropic lacquer according to the invention

If the same alkyd resin, keeping the above recipe but having incorporated therein 25% of the thixotropy support according to Example 1(b) as prepared according to Example 1(a), is used, a degree of thixotropy is obtained which permits the application of a layer thickness greater by 50% in the wet state without any running.

EXAMPLE 6

(a) Preparation of the thixotropic polyurethane

About 578 parts of triisopropylbenzene diisocyanate are added dropwise to about 852 parts of octa-9,10-decene-1,12-diol while stirring at 160° C.–180° C. under a nitrogen protective gas and in about 3 hours. Stirring is continued for approximately another 5 to 6 hours at this temperature until the NCO value has fallen to 0. The product is a light yellow, wax-like resin with a softening point of 144° C.–146° C.; content: 2.3% OH; acid number: 0.2.

(b) Preparation of the thixotropic alkyd resin

About 180 parts of the thixotropy support of (a) in the form of small lumps are added to about 820 parts of a styrene-modified, oil containing alkyd resin (41% linseed oil, 24% phthalic anhydride, 25% styrene) which was prepared from 52.87 wt.-percent linseed oil, 16.39 wt.-percent glycerol and 30.74 wt.-percent phthalic anhydride at 260° C. Acid No.=8.75 parts by weight of this alkyd are modified with 25 parts by weight of styrene by heating during 12 h. at 200° C., and while stirring, this modified alkyd resin is heated to about 160° C. in a nitrogen atmosphere. At this temperature, stirring is continued for about 12 hours and then a solids content of 60% is adjusted with xylene. A solution of a clear, highly thixotropic, styrene-modified alkyd resin is obtained.

(c) Preparation of a lacquer

An air drying and heat drying hammered metal effect lacquer is prepared from:

About 53.50 parts of the alkyd resin of (b),
About 2.00 parts of a drier solution, containing 1.5% Co$^{++}$, 22% Pb$^{+++}$, 1.5% Mn$^{++}$, calculated as metal ions.
About 40.60 parts of ethyl acetate:butylacetate:isopropanol:butanol 15:15:5:5,
About 5.90 parts of aluminum bronze paste and
About 0.20 part by weight of a 10% silicone solution as effect giver.

The lacquer can be sprayed up to a wet coating of 150–200 g./m.$^2$ on vertical surfaces without running, corresponding to a dry coat thickness of 60–80μ.

It is to be understood that any unsaturated oil modified alkyd resin may be made thixotropic by following the teaching of this invention and that any suitable resin may be substituted into the examples for those particularly described therein. Further, any polyurethane within the description above may be used as a thixotropic support.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. Thixotropic unsaturated oil modified alkyd resins containing from about one percent to about 30 percent by weight of a polyurethane prepared by reacting aromatic diisocyanates having both NCO groups sterically hindered with a polyhydric alcohol.

2. The alkyd resins of claim 1 wherein the diisocyanate is 1,3,5-triisopropylbenzene-2,4-diisocyanate.

3. Alkyd resins of claim 1 wherein the polyhydric alcohol is octa-9,10-decene-1,12-diol.

4. Alkyd resins of claim 1 wherein the polyhydric alcohol is octadecane-1,12-diol.

References Cited

UNITED STATES PATENTS

| | | | |
|---|---|---|---|
| 2,916,403 | 12/1959 | Calderwood | 117—232 |
| 2,935,487 | 5/1960 | Fox et al. | 260—75 |
| 3,183,109 | 5/1965 | Neumann et al. | 106—252 |
| 3,371,056 | 2/1968 | Delius | 260—22 |

DONALD E. CZAJA, Primary Examiner

R. W. GRIFFIN, Assistant Examiner

U.S. Cl. X.R.

260—21, 31.2, 31.6, 33.4, 33.6, 39.40; 117—132, 161